(12) United States Patent
Gilman

(10) Patent No.: US 9,248,592 B2
(45) Date of Patent: Feb. 2, 2016

(54) LOGO DISPLAYING MINIATURE FOOTBALL PYLON

(75) Inventor: Neil F. Gilman, South Glastonbury, CT (US)

(73) Assignee: MARTY GILMAN, INC., Gilman, CT (US)

(*) Notice: Subject to any disclaimer, the term of this patent is extended or adjusted under 35 U.S.C. 154(b) by 424 days.

(21) Appl. No.: 13/226,456

(22) Filed: Sep. 6, 2011

(65) Prior Publication Data

US 2013/0055605 A1    Mar. 7, 2013

(51) Int. Cl.
*G09F 23/00* (2006.01)
*B29C 45/14* (2006.01)

(52) U.S. Cl.
CPC ...... *B29C 45/14065* (2013.01); *G09F 23/0066* (2013.01); *B29C 2045/14106* (2013.01)

(58) Field of Classification Search
CPC ......... E01F 9/06; E01F 9/0122; E01F 9/0124; E01F 9/0175; E01F 9/011; G09F 7/18; G09F 2007/1804; G09F 7/20; G09F 15/0037; G09F 15/0056; G09F 7/00; A63B 71/0672; A63B 71/023; A63B 71/0619; A63C 19/06
See application file for complete search history.

(56) References Cited

U.S. PATENT DOCUMENTS

| | | | | | |
|---|---|---|---|---|---|
| 4,880,275 | A | * | 11/1989 | Lanteri | 297/391 |
| 5,280,905 | A | * | 1/1994 | Micco | 473/444 |
| 6,726,605 | B2 | * | 4/2004 | Chen | 482/87 |
| 2003/0188468 | A1 | * | 10/2003 | Tahan | 40/538 |

* cited by examiner

*Primary Examiner* — Cassandra Davis
(74) *Attorney, Agent, or Firm* — Day Pitney LLP

(57) ABSTRACT

A logo displaying miniature football pylon is disclosed. The pylon includes an elastomeric body having a greater longitudinal, height-wise dimension than a transverse dimension. The pylon has a height-wise bottom portion, which includes a height-wise bottom surface for being seated on a tabletop, and a weighted mass substantially concealed therein, providing stability to the pylon when positioned on the tabletop. The pylon includes a top surface which height-wise opposes the bottom surface, and at least one side surface that includes at least one logo portion, which is at or adjacent to the pylon top surface, and contains logo indicia. From this, the pylon is capable of stably displaying the logo indicia in an upright configuration above the tabletop.

5 Claims, 3 Drawing Sheets

LOGO DISPLAYING MINIATURE FOOTBALL PYLON

BACKGROUND OF THE INVENTION

1. Field of the Disclosed Embodiments

The disclosed embodiments relate to a logo displaying miniature football pylon.

2. Background of the Disclosed Embodiments

Elastomeric end zone pylons are known. Having such pylons at one's disposal, for example, on one's desk, as a souvenir, would symbolize the devotion to and support for a professional sports club or high school or college team. That is, sports memorabilia, at the fingertips of a sports fan in the comfort of their own home, is a concept every sports fan is familiar with for expressing loyalty to or support for a particular team or school.

The size of such typical field pylons is too great to realistically place on one's desk and carry, for example, from a home office to a TV den when watching a sports game. Accordingly, a souvenir sized pylon is desired having a substantially similar look and feel of the actual field pylon. As can be appreciated, the pylon, with an elongated or oblong shape, would need to be vertically stable. Sports memorabilia which easily tips on an office desk or tips into snacks while watching a sports event would quickly become relegated to a closet.

To increase the team spirit and pride of ownership of such pylons by a sports fan, it is desired to have such pylons identify a favorite team or plural teams of the sports fan. Such identification may be in the form of logos embedded in the sides of the pylons. With a souvenir sized pylon, the location of the logos would need to be raised enough, in a pylon height-wise direction, such that the owner, and acquaintances, may easily see and recognize the team logos.

SUMMARY OF THE DISCLOSED EMBODIMENTS

A logo displaying miniature football pylon is disclosed. The pylon includes an elastomeric body having a greater longitudinal, height-wise dimension than a transverse dimension. The pylon has a height-wise bottom portion, which includes a height-wise bottom surface for being seated on a tabletop, and a weighted mass substantially concealed therein, providing stability to the pylon when positioned on the tabletop. The pylon includes a top surface which height-wise opposes the bottom surface, and at least one side surface that includes at least one logo portion, which is at or adjacent to the pylon top surface, and contains logo indicia. From this, the pylon is capable of stably displaying the logo indicia in an upright configuration above the tabletop.

BRIEF DESCRIPTION OF THE FIGURES

The provided figures, which are not limiting, illustrate one disclosed embodiment, in which.

DETAILED DESCRIPTION OF THE DISCLOSED EMBODIMENTS

Figure 1:
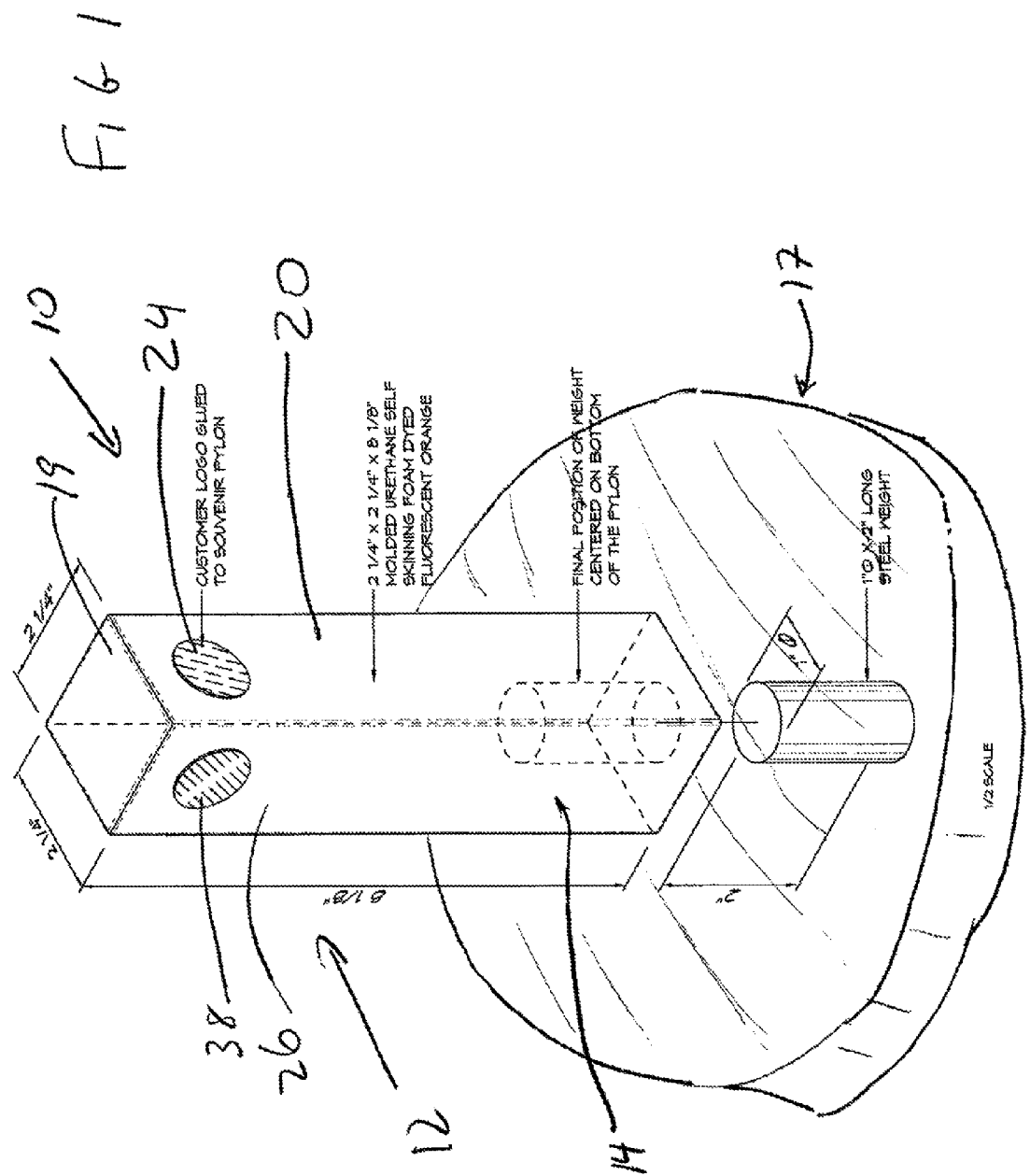
FIG. 1 is an isometric view of the pylon.
Figure 2:
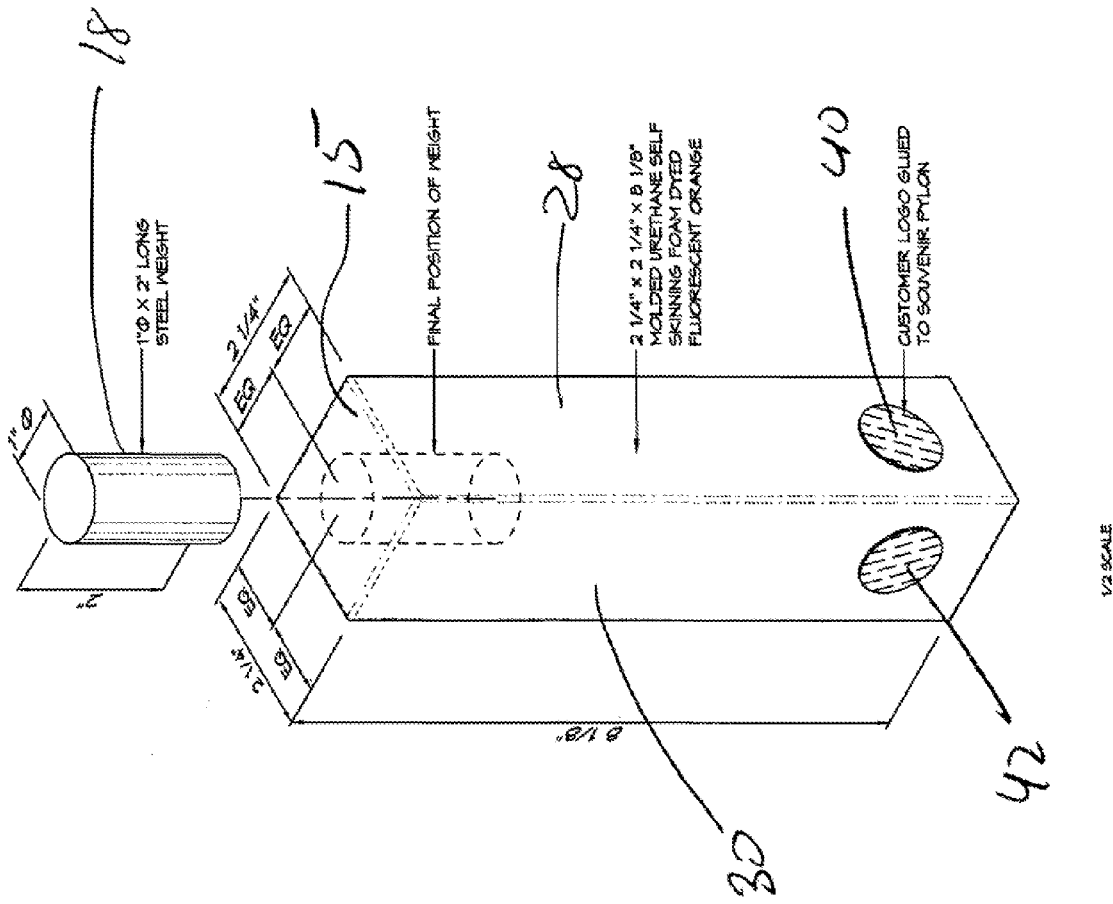
FIG. 2 is an inverted view of the pylon.

Turning to the figures, a logo displaying miniature football pylon 10 is illustrated. The pylon 10 comprises an elastomeric body 12 having a greater longitudinal, height-wise dimension than a transverse dimension. Transverse directions for the pylon 10 include, for a parallel-piped shape, a widthwise direction and a depth-wise, or thickness, direction for the pylon, each of which are mutually perpendicular and perpendicular to the height-wise, direction. Alternatively, a transverse direction includes, for a cylindrical shape, a radial direction for the pylon.

The pylon 10 includes a height-wise bottom portion 14, which includes a height-wise bottom surface 15 for being seated on a tabletop 17. In addition, the bottom portion 14 includes a weighted mass 18 substantially concealed therein. The weighted mass 18 provides stability to the pylon 10 when positioned on a tabletop 17. For example, the center of gravity of the pylon is lowered so that it does not easily tip.

The pylon includes a top surface 19 which height-wise opposes the bottom surface 15, and at least one side surface 20. The side surface 20 includes at least one logo portion 24, which is at or adjacent to the pylon top surface 19, and contains logo indicia.

From the above configuration, the pylon is capable of stably displaying the logo indicia in an upright configuration above the tabletop 17. The logo indicia would be, for example, illustrating a sporting team logo. With the pylon sized as a desktop souvenir, the location of the logo is raised enough, in a pylon height-wise direction, such that the owner and acquaintances may easily see and recognize the team logo. Ownership of such a pylon, with the team logo at or adjacent to the pylon top surface, would express a sports fan loyalty to or support for a particular team or school.

Turning bask to the illustrations, the pylon 10 comprises plural side surfaces 20, 26-30. The plural side surfaces include at least four side surfaces 20, 26-30, of which opposing first and second surfaces 20, 28 are front and back surfaces, depth-wise spaced on the pylon 10, defining a depth-wise span of the pylon 10. Opposing third and fourth surfaces 26, 30 are left and right surfaces, widthwise spaced on the pylon 10, defining a widthwise span of the pylon 10. The illustrated pylon body is a substantially oblong, rectangular parallel piped shape. The bottom and top surfaces 15, 19 have a substantially square shape, and the four side surfaces 20, 26-30 have a substantially rectangular shape.

In alternative embodiments, the pylons have fewer than four sides, such as with cylindrical or triangular cross-sections. In yet additional alternatives, the pylons have more than four sides, such as octagons and other multi-sided shapes.

Each of the four side surfaces 20, 26-30 includes one of four logo portions 24, 38-42, at or adjacent to the pylon top surface 19, of which opposing first and second logo portions 24, are front and back logo portions, disposed on respective front and back surfaces 20, 28. Opposing third and fourth logo portions 38, 42 are left and right logo portions, disposed on respective left and right surfaces 26, 30.

The illustrated pylon 10, with the rectangular parallel-piped shape, having logos on all side surfaces, can display an owner's favorite team logo from substantially all views when positioned on a table. When turned about its longitudinal axis on the table to the orientation illustrated in FIG. 1, the owner can view two side surfaces at one time and enjoy multiple viewings of their favorite team. If different logos are on each surface, an enhanced view of different teams can be appreciated at one time.

Opposing front and back logo portions 24, 40 are centered on respective front and back surfaces 20, 28 along the widthwise span of the pylon 10. Similarly, opposing left and right logo portions 38, 42 are centered on respective left and right surfaces 26, 30 along the depth-wise span of the pylon 10.

Furthermore, each of the logo portions 24, 38-42 is height-wise offset from the pylon top surface 19 by a substantially same distance. For example, a distance between the pylon top surface 19 and a height-wise top edge of each of the logo portions 24, 38-42 is approximately five to twenty-five percent of the height-wise span of the pylon.

This configuration provides a pleasing harmonious visual effect. It also has a functional effect in that, with a souvenir sized pylon, the location of the logos is raised enough, in a pylon height-wise direction, such that the owner, and acquaintances, may easily see and recognize the team logo. However, the specifics of the height-wise placement and orientation of the logos can be modified to a reasonable extent if a different effect is sought.

Each of the logo portions 24, 38-42 is substantially identical, that is, each includes indicia from a same sports team. However, each can include indicia from different sports teams, depending on the preference of the pylon owner. Alternatively, non-sports indicia may be included.

Each of the logo portions 24, 38-42 is provided on logo portion material, and that material is connected to the respective pylon side surface. For example, the logo indicia are embroidered onto the logo portion material and the logo portion material is adhered to the pylon side surface 20, such as by glue or tape. A suitable logo portion material is a synthetic fabric, such as cloth polyester. An alternative material to use as a logo is a decal that is applied with self adhesive.

As indicated, the weighted mass is in the bottom portion 14 of the pylon 10. The height-wise span of the bottom portion 14 of the pylon 10, and thus the height-wise span of the weighted mass, is conceived of being less than one-fourth (25%) of the height-wise span of the pylon. Yet more specifically, the height-wise span of the pylon 10 is approximately eight inches and the bottom portion 14 is approximately the height-wise bottom two inches of the pylon 10.

Further regarding the size of the pylon elements, the bottom and top surfaces 15, 19 have a substantially same surface area. More specifically, a lengthwise span of each edge of the bottom and top surfaces 15, 19 is between a quarter and a third of the height-wise span of the pylon 10. For example, the lengthwise span of each edge of the bottom and top surfaces 15, 19 is approximately two and a quarter inches. Alternative shapes of the souvenir pylon could include a range of lengthwise spans of 1.5" to 2.5" and a range of height-wise spans of between 7" to 9". The size of the logo is consistent with the width dimension of the souvenir pylon. It can range from 1" to 2" square depending on the proportionality of the logo.

A height-wise span of each logo can be about one eighth of the height of the pylon 10. The widthwise span of each logo can be about three quarters of the widthwise span of the pylon 10.

The weighted mass has a one inch diameter and a two inch axial length which extends in the pylon height-wise direction. With the above noted size of the pylon, both in a longitudinal and a transverse cross-sectional area, the weighted mass is fully concealed within the bottom, center of the pylon. Thus, stability is provided without compromising the appearance of the pylon. In addition, there is enough elastomeric material around the mass so that the pylon remains easy to grip along its entire height-wise span.

Regarding the elastomeric material, the pylon elastomer is polyurethane, and more specifically, self-skinning polyurethane foam. In addition, the elastomer is dyed red or orange, thereby matching the color of NCAA regulation football-style goal pylons.

Figure 3:
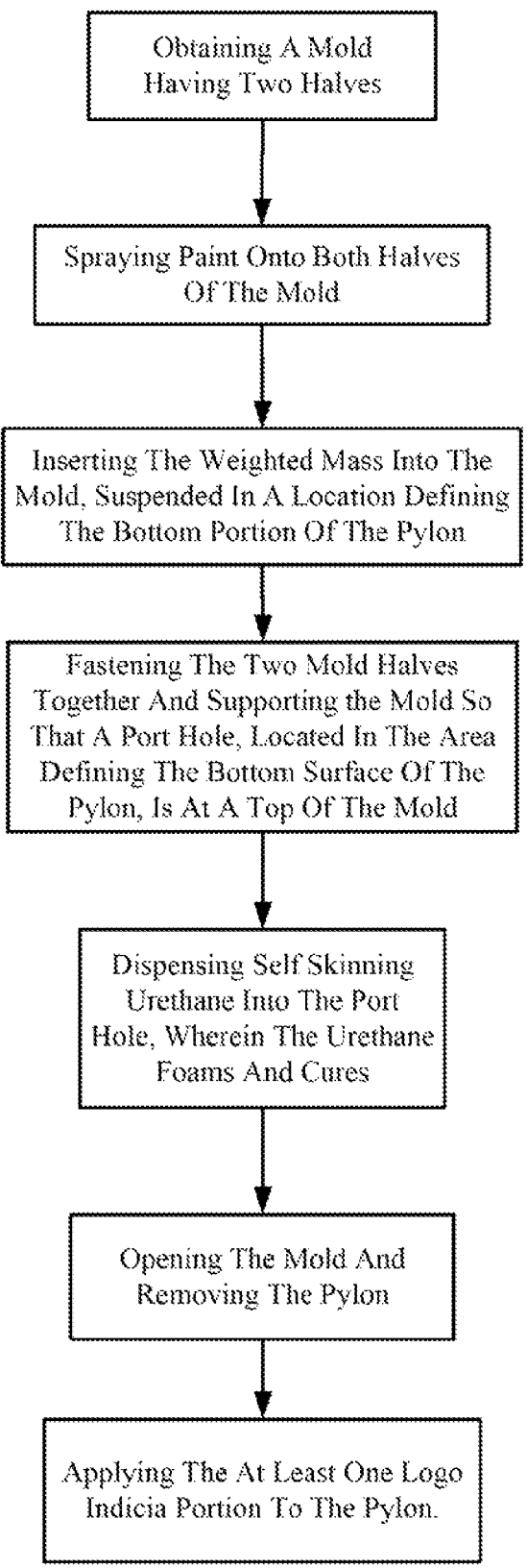
FIG. 3 illustrates steps for manufacturing the pylon.

Turning to FIG. 3, a method of making the pylon includes a first step S1 of obtaining an aluminum mold, where the mold has two halves. A second step S2 is spraying paint onto both halves of the mold. A third step S3 is inserting the weighted mass into the mold using, for example, a powered magnet, for suspending the mass in a location defining the bottom portion of the pylon. A fourth step S4 is fastening the two mold halves together, using for example, a locking clamp. A fifth step S5 is supporting the mold so that a port hole in the mold, located in the area defining the bottom surface of the pylon, is at the top of the mold, facing an upward direction. A sixth step S6 is dispensing self skinning polyurethane into the port hole, wherein the polyurethane foams to the top of the mold and cures. A seventh step S7 is opening the mold and removing the pylon using, for example, air induction or other means. An eighth step S8 is applying the at least one logo portion to the pylon.

Accordingly, an upright, logo displaying tabletop pylon has been disclosed. The pylon includes an elastomeric body having a greater longitudinal, height-wise dimension than a transverse dimension. The pylon has a height-wise bottom portion, which includes a bottom surface for being seated on a tabletop, and a weighted mass substantially concealed therein, providing stability to the pylon when positioned on the tabletop. The pylon includes a top surface which height-wise opposes the bottom surface, and at least one side surface that includes at least one logo portion, which is at or adjacent to the pylon top surface, and contains logo indicia. From this, the pylon is capable of stably displaying the logo indicia in an upright configuration above the tabletop.

The disclosed pylon is capable of being at one's disposal, for example, on one's desk, as a souvenir, so as to express loyalty to or support for a particular team or school. The disclosed souvenir sized pylon has a substantially similar look and feel of an actual game day pylon, and is vertically stable. To symbolize the devotion to and support for a sports club, the disclosed pylon has logos for identifying a favorite professional team or school team of the sports fan. The location of the logos is raised enough, in a pylon height-wise direction, such that the owner, and acquaintances, may easily see and recognize the team logo.

The disclosed elements may be configured in other specific forms, without departing from the spirit or essential characteristics identified herein. The embodiments are in all respects only as illustrative and not as restrictive. The scope of the embodiments is, therefore, indicated by the appended claims and their combination in whole or in part rather than by the foregoing description. All changes that come within the meaning and range of equivalency of the claims are to be embraced within their scope.

I claim:

1. A logo displaying miniature football end zone pylon, comprising:
   a square bottom and a square top, each having a widthwise direction and a depthwise direction; and
   four symmetrical, elongate, orthogonal, planar rectangular sides joining the square bottom to the square top so that the widthwise direction and the depthwise direction are mutually perpendicular to the heightwise direction;
   wherein the square bottom, square top and four sides cooperate to form an outer surface of the logo displaying miniature football end zone pylon, the logo displaying miniature football end zone pylon having a height between about seven and nine inches and a width between about one and a half and about two and one half inches, and substantially the same ratio of width to height of a standard football end zone pylon; and
   wherein:
   a) the logo displaying miniature football end zone pylon includes a weight located within the outer surface of the logo displaying miniature football end zone pylon disposed near the square bottom;

b) the logo displaying miniature football end zone pylon is formed from self-skinning elastomeric polyurethane foam in intimate direct contact with a majority of the surface area of the weight; and c) each of the four rectangular sides of the logo displaying miniature football end zone pylon includes a logo of a football sports team or organization attached thereto on a logo portion material, the logo potion material secured to each respective side of the pylon, and each of the logo portions being heightwise offset from the square top by a substantially same distance.

2. The logo displaying miniature football end zone pylon of claim 1, wherein the logo displaying miniature football end zone pylon further includes a layer of paint disposed over and in direct intimate contact with the elastomeric self-skinning polyurethane foam.

3. The logo displaying miniature football end zone pylon of claim 1, wherein the logo displaying miniature football end zone pylon includes a plurality of logos of a football sports team or organization attached thereto.

4. The logo displaying miniature football end zone pylon of claim 1, wherein the at least one logo is disposed proximate the square top of the miniature football end zone pylon.

5. The logo displaying miniature football end zone pylon of claim 1, wherein the logo displaying miniature football end zone pylon is dyed red or orange to match the color of NCAA regulation football-style end zone pylons.

\* \* \* \* \*